(12) United States Patent
Lee et al.

(10) Patent No.: US 11,400,880 B2
(45) Date of Patent: Aug. 2, 2022

(54) ROOF AIRBAG FOR A VEHICLE

(71) Applicant: HYUNDAI MOBIS CO., LTD., Seoul (KR)

(72) Inventors: Choong Ryung Lee, Yongin-si (KR); Byung Ho Min, Yongin-si (KR)

(73) Assignee: Hyundai Mobis Co., Ltd.vvvvvvvvv, Seoul (KR)

( * ) Notice: Subject to any disclaimer, the term of this patent is extended or adjusted under 35 U.S.C. 154(b) by 0 days.

(21) Appl. No.: 16/951,991

(22) Filed: Nov. 18, 2020

(65) Prior Publication Data

US 2021/0179004 A1 Jun. 17, 2021

(30) Foreign Application Priority Data

Dec. 17, 2019 (KR) .................. 10-2019-0169276

(51) Int. Cl.
*B60R 21/214* (2011.01)
*B60R 21/2334* (2011.01)

(52) U.S. Cl.
CPC ........ *B60R 21/214* (2013.01); *B60R 21/2334* (2013.01)

(58) Field of Classification Search
CPC ............. B60R 21/214; B60R 21/2334; B60R 2021/0018; B60R 2021/26423; B60R 2021/23316
See application file for complete search history.

(56) References Cited

U.S. PATENT DOCUMENTS

| | | | |
|---|---|---|---|
| 6,189,960 B1 * | 2/2001 | Mumura | B60J 7/0015 160/7 |
| 6,705,640 B2 * | 3/2004 | Takahashi | B60R 21/232 280/730.2 |
| 9,771,048 B2 * | 9/2017 | Min | B60R 21/214 |
| 10,449,923 B2 * | 10/2019 | Son | B60R 21/214 |
| 10,604,103 B2 * | 3/2020 | Lee | B60R 21/2338 |
| 2006/0163849 A1 * | 7/2006 | Keshavaraj | B60R 21/2338 280/730.2 |
| 2017/0015269 A1 * | 1/2017 | Min | B60R 21/214 |
| 2017/0267199 A1 * | 9/2017 | Schutt | B60R 21/13 |

(Continued)

FOREIGN PATENT DOCUMENTS

| | | | | |
|---|---|---|---|---|
| DE | 102007000343 A1 * | 3/2008 | ......... | B60R 21/2346 |
| GB | 2542509 A * | 3/2017 | ............ | B60R 21/04 |
| KR | 100656759 B1 * | 12/2006 | | |

(Continued)

*Primary Examiner* — Paul N Dickson
*Assistant Examiner* — Kurtis Nielson
(74) *Attorney, Agent, or Firm* — H.C. Park & Associates, PLC (57) ABSTRACT

A roof airbag for a vehicle including deployment guides configured to extend in forward and backward directions of a vehicle and disposed to be spaced laterally apart from each other, an inflator located between the deployment guides spaced apart from each other and configured to discharge gas therefrom during operation thereof, and a cushion located between the deployment guides spaced apart from each other, deployed in an extension direction of the deployment guides and including a deployment chamber configured to be deployed while the gas discharged from the inflator flows thereinto and delay chambers configured such that the gas flows thereinto in a deployed state thereof.

14 Claims, 12 Drawing Sheets

(56) References Cited

U.S. PATENT DOCUMENTS

2018/0162313 A1* 6/2018 Lee ..................... B60R 21/214
2018/0162314 A1* 6/2018 Lee ..................... B60R 21/213

FOREIGN PATENT DOCUMENTS

| KR | 10-2009-0007103 | | 1/2009 | |
|----|----|----|----|----|
| KR | 20170049651 A | * | 5/2017 | |
| WO | WO-2005039938 A1 | * | 5/2005 | ......... B60R 21/2338 |
| WO | WO-2007058211 A1 | * | 5/2007 | ........... B60R 21/232 |

* cited by examiner

FIG. 1

Prior Art

ROOF AIRBAG FOR A VEHICLE

CROSS-REFERENCE TO RELATED APPLICATION

This application claims priority from Korean Patent Application No. 10-2019-0169276, filed on Dec. 17, 2019, which is hereby incorporated by reference for all purposes as if set forth herein.

BACKGROUND

Field

Exemplary embodiments relate to a roof airbag for a vehicle, and, more particularly to an airbag in which a cushion is deployed on a sunroof of a vehicle so as to prevent a passenger from being thrown from the vehicle in case of overturn of the vehicle.

Discussion of the Background

In general, various airbags are installed in a vehicle so as to ensure safety of passengers. In more detail, the airbags are configured such that cushions are deployed in front of, at both sides of, and above the passengers so as to protect passengers.

An airbag includes a cushion configured to be deployed, and an inflator configured to inflate the cushion by injecting gas into the cushion when a signal from the vehicle is received.

Particularly, a roof airbag for a vehicle is installed in the upper portion of a vehicle such that a cushion thereof is deployed above a passenger, and in case of overturn of the vehicle, the cushion is deployed towards a panoramic sunroof and may thus prevent the passenger from being thrown from the vehicle.

Figure 1:
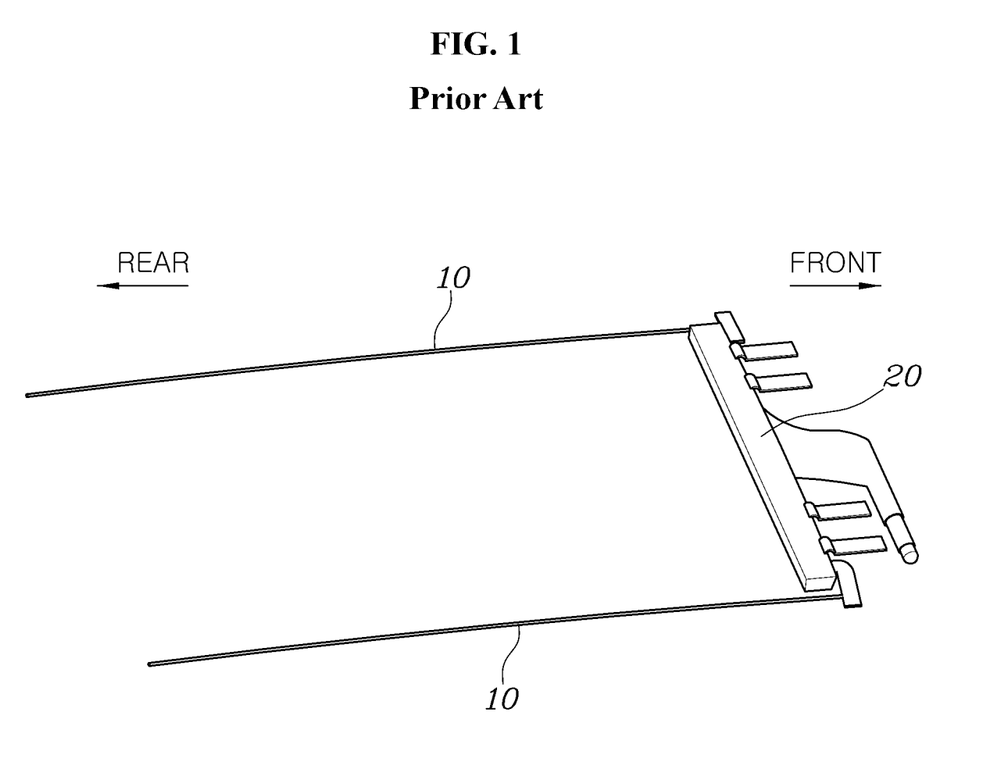
FIG. 1 is a perspective view of a conventional roof airbag for a vehicle in the state before a cushion thereof is deployed.
Figure 2:
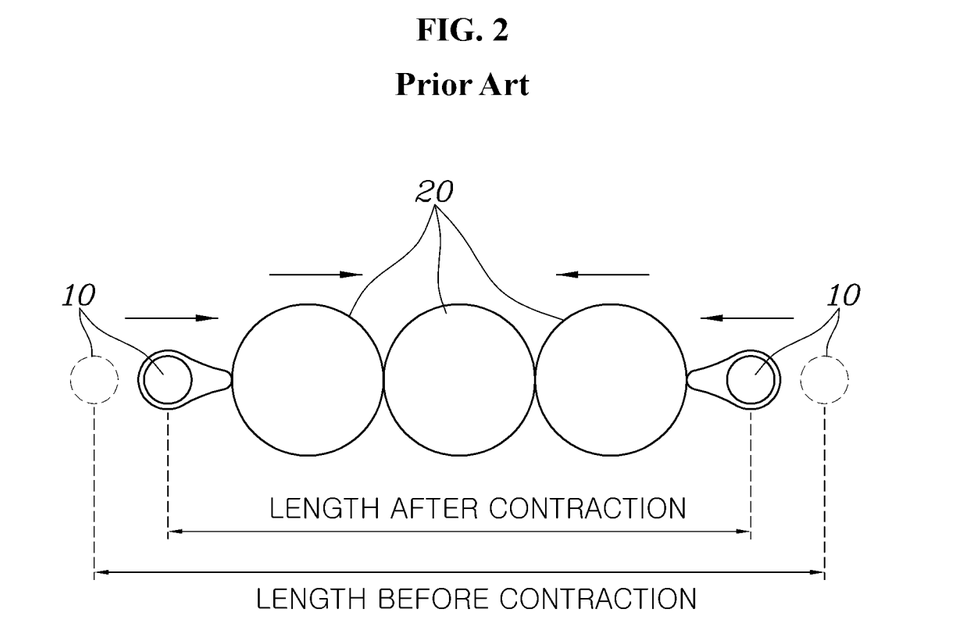
FIG. 2 is a cross-sectional view of the conventional roof airbag for a vehicle in the state in which the cushion thereof is deployed.

FIG. 1 is a perspective view of a conventional roof airbag for a vehicle in the state before a cushion thereof is deployed, and FIG. 2 is a cross-sectional view of the conventional roof airbag for a vehicle in the state in which the cushion thereof is deployed.

Referring to FIGS. 1 and 2, in the conventional roof airbag for a vehicle, in order to ensure supporting force at the center of a cushion 20, the cushion 20 is deployed in the front or rear portion of a vehicle in the forward and backward directions along deployment guides 10.

However, as shown in FIG. 2, as the cushion 20 of the airbag is expanded, the cushion 20 is contracted in the width direction of the vehicle, and thereby, a great load is applied to the deployment guides 10 configured to guide the deployment of the cushion 20 and thus reliability of the deployment of the airbag is lowered due to disturbance of the deployment of the cushion 20 or damage to the cushion 20 or the deployment guides 10.

In order to solve these problems, if the length of the cushion 20 in the width direction, rather than the length of the deployment guides 10 in the width direction, is increased, when the cushion 20 is deployed, the cushion 20 is moved in the vertical direction and thus stability of the deployment of the cushion 20 is lowered, and a clearance is formed in the vertical direction of the cushion 20 in the deployed state thereof and thus performance of the airbag to restrain a passenger is lowered.

Further, as gas is injected into the cushion 20 of the airbag, there are positional differences in gas injection amounts, and the cushion 20 is damaged due to high pressure.

The above information disclosed in this Background section is only for enhancement of understanding of the background of the invention and, therefore, it may contain information that does not constitute prior art.

SUMMARY

Exemplary embodiments of the present invention provide a roof airbag for a vehicle which improves reliability of deployment of a cushion while releasing pressure so as to avoid generation of high pressure within the cushion.

Additional features of the invention will be set forth in the description which follows, and in part will be apparent from the description, or may be learned by practice of the invention.

An exemplary embodiment of the invention provides a roof airbag for a vehicle, including deployment guides configured to extend in forward and backward directions of a vehicle and disposed to be spaced laterally apart from each other, an inflator located between the deployment guides spaced apart from each other and configured to discharge gas therefrom during operation thereof, and a cushion located between the deployment guides spaced apart from each other, deployed in an extension direction of the deployment guides and including a deployment chamber configured to be deployed while the gas discharged from the inflator flows thereinto and delay chambers configured such that the gas flows thereinto in a deployed state thereof.

The deployment chamber may be deployed in a deployment direction of the cushion while the gas discharged from the inflator flows into the deployment chamber, and the delay chambers may be configured such that the gas in the deployment chamber flows thereinto in a state in which the delay chambers are deployed together with the deployment chamber.

The gas in the deployment chamber may flow into the delay chambers in an opposite direction to the deployment direction of the cushion.

Front ends of the delay chambers in the deployment direction of the cushion may be cut off, rear ends of the delay chambers in the deployment direction of the cushion may be opened, and the gas in the deployment chamber may flow into the delay chambers through the opened rear ends of the delay chambers.

The deployment chamber and the delay chambers may be disposed laterally so as to totally or partially overlap each other in the forward and backward directions of the vehicle, and be isolated from each other by cut-off lines configured to extend in the forward and backward directions of the vehicle.

The delay chambers may be disposed at a center of the cushion, and the deployment chamber may be disposed to be located at both sides of the delay chambers.

The cushion may further include communication chambers located behind the delay chambers in the deployment direction of the cushion and configured to communicate with rear ends of the delay chambers in the deployment direction of the cushion and communicate with the deployment chamber.

In a state in which portions of rear ends of the delay chambers in the deployment direction of the cushion communicate with the communication chambers and remaining portions of the rear ends of the delay chambers are isolated from the communication chambers, front ends of the delay chambers in the deployment direction of the cushion may communicate with the portions of the rear ends thereof communicating with the communication chambers.

The delay chambers may be disposed at a center of the cushion, the deployment chamber may be disposed to be located at both sides of the delay chambers, and the portions of the rear ends of the delay chambers communicating with the communication chambers may be located at centers of the delay chambers.

The delay chambers may be disposed at a center of the cushion, the deployment chamber may be disposed to be located at both sides of the delay chambers, the portions of the rear ends of the delay chambers communicating with communication chambers may be located at both sides of the delay chambers, and centers of the delay chambers may be isolated from the communication chambers by cut-off lines.

The delay chambers may be disposed at a center of the cushion, the deployment chamber may be disposed to be located at both sides of the delay chambers, and the communication chambers may be disposed at the center of the cushion behind the delay chambers in the deployment direction of the cushion and be divided into two parts by cut-off lines.

The delay chambers may be disposed at a center and at both sides of the cushion, respectively, and the deployment chamber may be disposed to be located between the delay chambers disposed at the center of the cushion and the delay chambers disposed at the sides of the cushion.

The delay chambers may be a plurality of delay chambers disposed to be spaced apart from each other in a deployment direction of the cushion, and the cushion may further include communication chambers located between the delay chambers or located behind the delay chambers in the deployment direction of the cushion and configured to communicate with the respective delay chambers and the deployment chamber.

The delay chambers spaced apart from each other may be disposed such that lengths thereof are gradually increased in the deployment direction of the cushion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description of the embodiments, terms, such as "first" and "second", are used only to describe various elements, and these elements should not be construed to be limited by these terms. These terms are used only to distinguish one element from other elements. For example, a first element described hereinafter may be termed a second element, and similarly, a second element described hereinafter may be termed a first element, without departing from the scope of the invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to various embodiments of the present invention, examples of which are illustrated in the accompanying drawings and described below. In the drawings, the same or similar elements are denoted by the same reference numerals even when they are depicted in different drawings.

Figure 3:
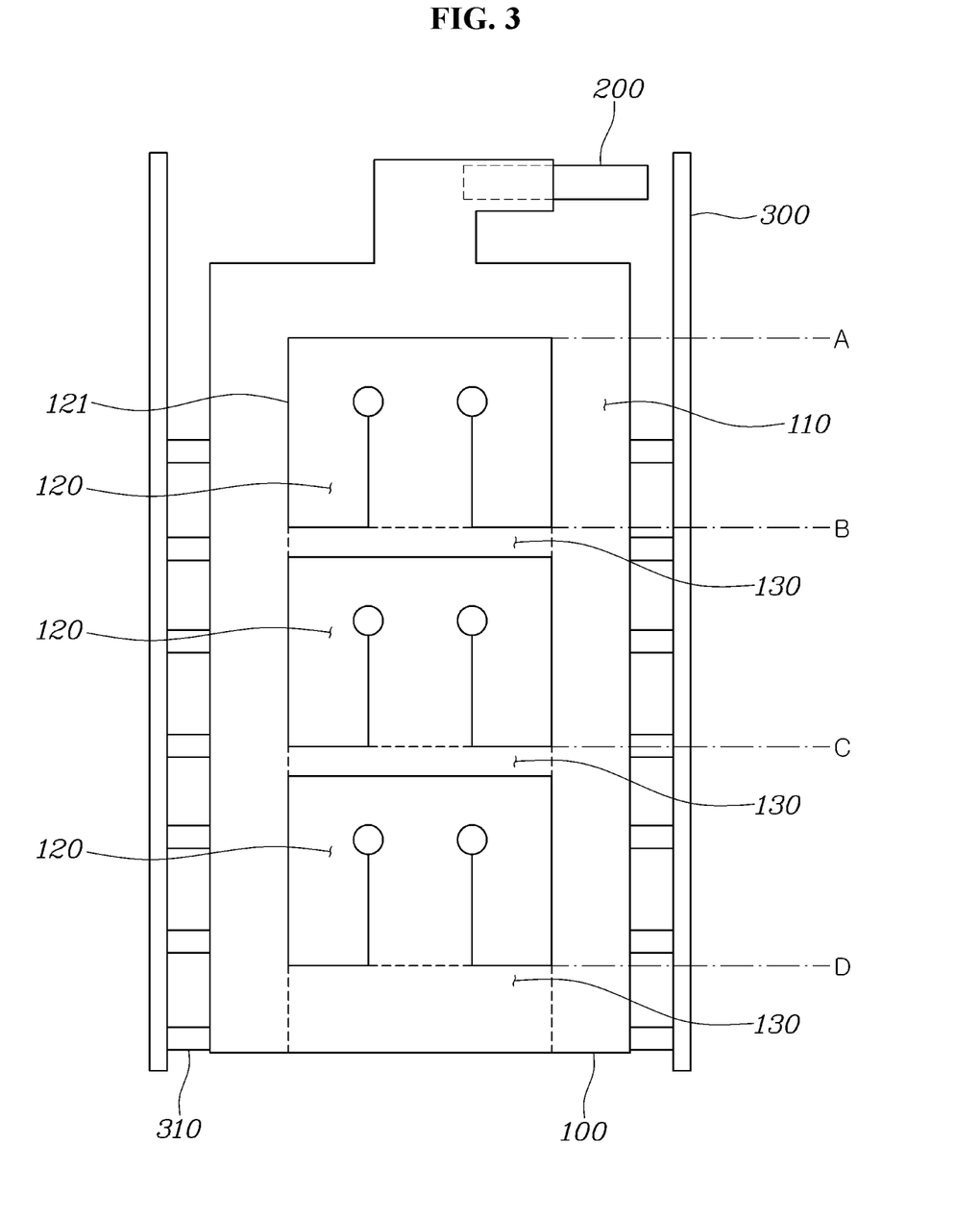
FIG. 3 is a view illustrating a roof airbag for a vehicle according to one embodiment of the present invention.
Figure 4:
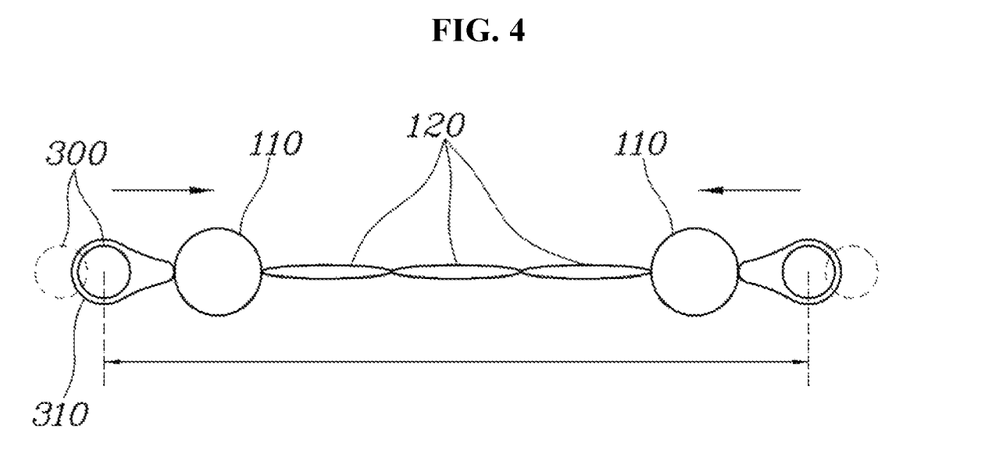
FIG. 4 is a cross-sectional view of the roof airbag for a vehicle according to one embodiment of the present invention in the state before gas flows into delay chambers.
Figure 5:
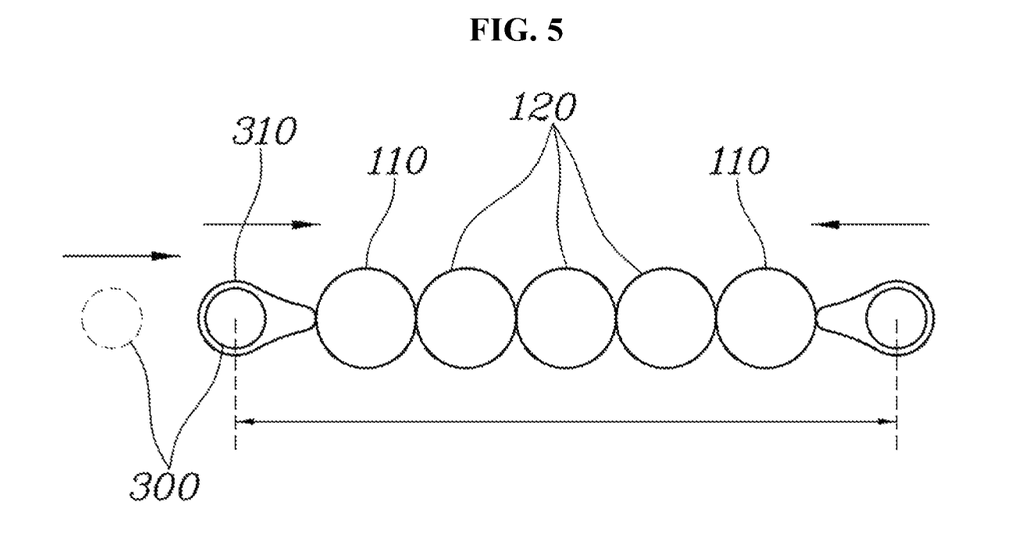
FIG. 5 is a cross-sectional view of the roof airbag for a vehicle according to one embodiment of the present invention in the state in which gas flows into the delay chambers.

FIG. 3 is a view illustrating a roof airbag for a vehicle according to one embodiment of the present invention. FIG. 4 is a cross-sectional view of the roof airbag for a vehicle according to one embodiment of the present invention in the state before gas flows into delay chambers 120. FIG. 5 is a cross-sectional view of the roof airbag for a vehicle according to one embodiment of the present invention in the state in which gas flows into the delay chambers 120.

Referring to FIGS. 3 to 5, the roof airbag for a vehicle according to one embodiment of the present invention includes deployment guides 300 which extend in the forward and backward directions of a vehicle and are disposed to be spaced laterally apart from each other, an inflator 200 which is located between the deployment guides 300 spaced apart from each other and discharges gas therefrom during operation, and a cushion 100 which is located between the deployment guides 300 spaced apart from each other, is deployed in the extension direction of the deployment guides 300 and includes a deployment chamber 110 deployed while the gas discharged from the inflator 200 flows into the deployment chamber 110 and delay chambers 120 into which the gas flows in the deployed state thereof.

The deployment guides 300 may be a plurality of cables or links which extends in the forward and backward directions of the vehicle, and be disposed to be spaced apart from each other in the lateral direction of the vehicle. Particularly, the deployment guides 300 may be located on both sides of a panoramic roof of the vehicle close to both ends of the panoramic roof The inflator 200 may be operated to discharge gas when a collision signal of the vehicle is input. The inflator 200 may be located between the deployment guides 300, be connected to one side of the cushion 100, and thus supply gas to the cushion 100.

The cushion 100 may be located between the deployment guides 300, and be coupled to the deployment guides 300 so as to be slidable. Concretely, the cushion 100 may be slidably coupled to the deployment guides 300 by coupling rings 310, and be coupled to the deployment guides 300 in the state in which the cushion 100 is folded before operation of the inflator 200.

Particularly, the inflator 200 and the cushion 100 in the folded state may be located at designated ends (for example, front ends or rear ends) of the deployment guides 300, and particularly, be located close to the front end or the rear end of the panoramic roof.

The cushion 100 may be deployed in the extension direction of the deployment guides 300 when the inflator 200 is operated. That is, the cushion 100 may be deployed forwards or rearwards from the designated ends (for example, front ends or rear ends) of the deployment guides 300 in the forward and backward directions of the vehicle while sliding in the forward and backward directions of the vehicle in which the deployment guides 300 extend.

The cushion 100 may include the deployment chamber 110 and the delay chambers 120, and the deployment chamber 110 may be deployed by gas which is discharged from the inflator 200 and then flows into the deployment chamber 110. Particularly, the deployment chamber 110 may be expanded by the gas supplied thereinto, and slide along the deployment guides 300, thus being deployed.

The delay chambers 120 may be expanded by gas flowing thereinto in the state in which the delay chambers 120 are deployed due to expansion of the deployment chamber 110. That is, the delay chambers 120 are deployed later than the deployment chamber 110, and in this case, the delay chambers 120 may be expanded by inflow of gas from the deployment chamber 110 thereinto in the state in which the delay chambers 120 are deployed in the forward and backward directions of the vehicle.

The cushion 100 including the deployment chamber 110 and the delay chambers 120 is expanded in the vertical direction as gas flows thereinto, and simultaneously, the cushion 100 may be contracted in the width direction of the vehicle while pulling both ends of the cushion 100 to the center thereof, as compared to the state of the cushion 100 before expansion. That is, the cushion 100 may be contracted in the lateral direction as gas flows into the cushion 100.

Therefore, portions of the cushion 100 (i.e., the delay chambers 120) are expanded in the deployed state thereof and thus expansion of these portions is delayed, thereby releasing the pressure of the deployment chamber 110 and simultaneously reducing friction load applied to the deployment guides 300.

In more detail, the deployment chamber 110 may be deployed in the deployment direction of the cushion 100, i.e., the extension direction of the deployment guides 300, while gas from the inflator 200 flows into the deployment chamber 100, and the gas in the deployment chamber 110 may flow into the delay chambers 120 in the state in which the delay chambers 100 are deployed together with deployment of the deployment chamber 110.

That is, the deployment chamber 110 may extend in the deployment direction of the cushion 100 and the extension direction of the deployment guides 300, and be continuously deployed along the deployment guides 300 using gas supplied from the inflator 200 during operation of the inflator 200.

The gas in the deployment chamber 110 may flow into the delay chambers 120 in the opposite direction to the deployment direction of the cushion 100. That is, the delay chambers 120 may be expanded using gas flowing thereinto in the opposite direction to the deployment direction of the cushion 100 after the delay chambers 120 are deployed in the deployment direction of the cushion 100. In contrast, the deployment chamber 110 may be deployed and expanded simultaneously using gas flowing thereinto in the deployment direction of the cushion 100.

The rear portions of the delay chambers 120 in the deployment direction of the cushion 100 are connected to the deployment chamber 110 so that the gas in the deployment chamber 110 may flow into the delay chambers 120. That is, if the cushion 100 is deployed in a direction from the front portion to the rear portion of the vehicle, the rear portions of the delay chambers 120 are opened and thus gas may flow forwards from the rear ends of the delay chambers 120.

The front ends of the delay chambers 120 in the deployment direction of the cushion 100 are closed and the rear ends of the delay chambers 120 in the deployment direction of the cushion 100 are opened, and thus, the gas in the deployment chamber 110 may flow into the delay chambers 120 through the opened rear ends thereof.

Only the rear ends of the delay chambers 120 in the deployment direction of the cushion may be opened towards the deployment chamber 110, and the front ends and the side ends of the delay chambers 120 may be cut off from the deployment chamber 110. Particularly, cut-off lines may be formed between the delay chambers 120 and the deployment chamber 110 and thus may cut off air flow therebetween.

In more detail, the cut-off lines may be formed by coupling or adhering the upper and lower surfaces of the cushion 10 to each other, so as to cut off air flow. For example, the cut-off lines may be formed by adhering the upper and lower surfaces of the cushion 100 to each other using an adhesive, or by weaving the upper and lower surfaces of the cushion 100 so as to cross each other during a process of weaving the upper and lower surfaces of the cushion 100. Alternatively, the cut-off lines of the cushion 10 may be formed by forming sewing lines between the upper and lower surfaces of the cushion 100.

The deployment chamber 110 and the delay chambers 120 may be disposed laterally so as to totally or partially overlap each other in the forward and backward directions of the vehicle, and be isolated from each other by the cut-off lines extending in the forward and backward directions of the vehicle.

The deployment chamber 110 and the delay chambers 120 may be disposed laterally parallel to each other in the forward and backward directions of the vehicle, and be isolated from each other by the cut-off lines extending in the forward and backward directions of the vehicle. Particularly, the deployment chamber 110 may extend in the forward and backward directions of the vehicle, and the delay chambers 120 may be disposed at the side of the extended deployment chamber 110 in some regions of the deployment chamber 110.

Figure 6:
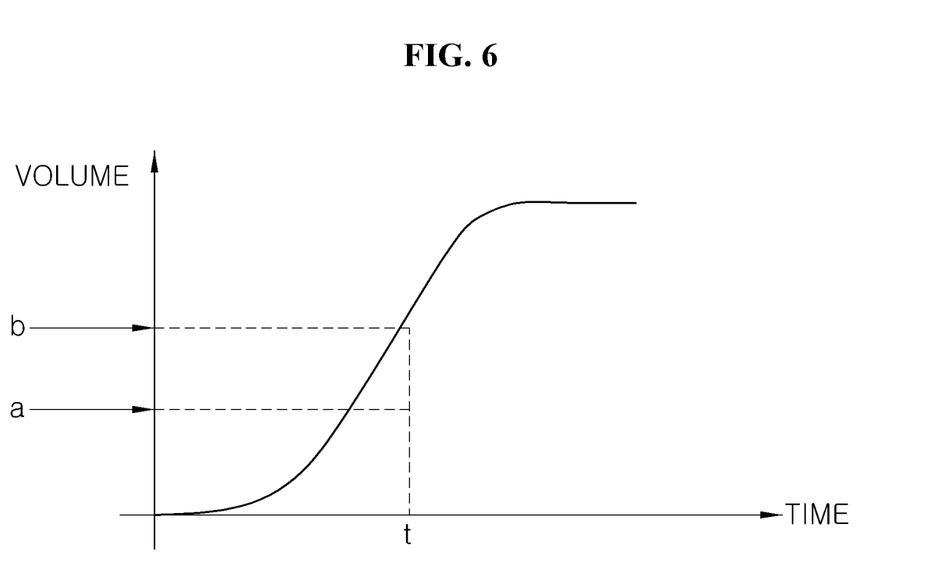
FIG. 6 is a graph showing a gas supply amount of an inflator according to one embodiment of the present invention over time.
Figure 7:
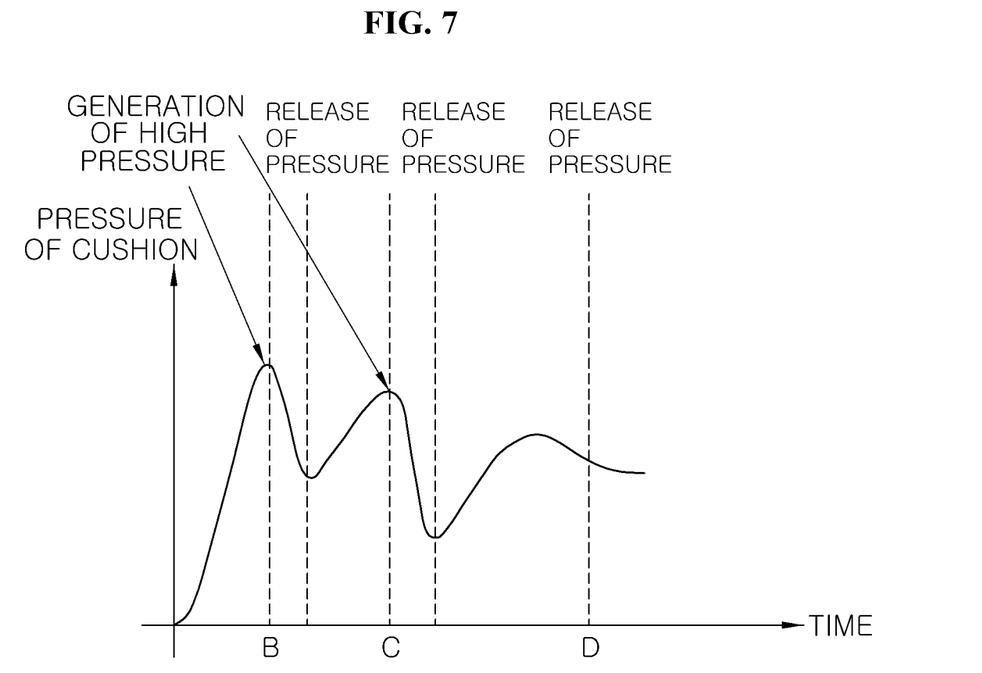
FIG. 7 is a graph showing a pressure change of a cushion according to one embodiment of the present invention over time.

FIG. 6 is a graph showing a gas supply amount of the inflator 200 according to one embodiment of the present invention over time, and FIG. 7 is a graph showing a pressure change of the cushion 100 according to one embodiment of the present invention over time.

Referring to FIGS. 6 and 7, the inflator 200 according to one embodiment of the present invention supplies a volume b of gas when a time t [sec] from the beginning of operation of the inflator 200 elapses, but the inner volume of the deployment chamber 110 up to a line B of FIG. 3 may be a volume a.

Therefore, when the time t [sec] from the beginning of operation of the inflator 200 elapses, a volume of b-a of gas is excessively supplied, and thereby, excessive pressure may be generated in the cushion 100 (i.e., the deployment chamber 110).

That is, when the gas supply performance of the inflator 200 exceeds the deployment speed of the airbag, excessive pressure is generated in the cushion 100 of the airbag, and thus, there is a possibility of damage to the cushion 100.

In the present invention, in order to solve the above problem, the delay chambers 120 may be disposed laterally parallel to the deployment chamber 110 so that the gas in the deployment chamber 110 is supplied to the delay chambers 120 at a plurality of positions B, C and D in the deployment direction of the deployment chamber 110 so as to avoid the excessive pressure generated in the cushion 100.

Particularly, the delay chambers 120 may be disposed at the center of the cushion 100, and the deployment chamber 110 may be disposed to be located at both sides of the delay chambers 120.

That is, the deployment chamber 100 may be located at both side ends of the cushion 100, thus being capable of deploying the cushion 100 using the gas flowing into the deployment chamber 100. Thereby, the deployment chamber 100 may stably deploy the cushion 100 at both sides of the cushion 100. Further, because the deployment chamber 100 is deployed at both side ends of the cushion 100, the deployment chamber 100 may induce the coupling lines 310 slidably coupled to the deployment guides 300 to slide without being inclined from the deployment guides 300, thereby being capable of preventing friction load from being concentrated upon the coupling lines 310.

The cushion 100 may further include communication chambers 130 which are located behind the delay chambers 120 in the deployment direction of the cushion 100, communicate with the rear ends of the delay chambers 120 in the deployment direction of the cushion 100, and communicate with the deployment chamber 110.

The communication chambers 130 may be located behind the delay chambers 120 so that the front ends of the communication chambers 130 may communicate with the delay chambers 120, and the communication chambers 130 may be located at the sides of the deployment chamber 110 so that both side ends of the communication chambers 130 may communicate with the deployment chamber 110. That is, the communication chambers 130 may receive gas in the deployment chamber 110, and transmit the received gas to the delay chambers 120.

For example, in the state in which portions of the rear ends of the delay chambers 120 in the deployment direction of the cushion 100 communicate with the corresponding communication chambers 130 and the remaining portions of the rear ends of the delay chambers 120 are isolated from the corresponding communication chambers 130, the front ends of the delay chambers 120 in the deployment direction of the cushion 100 may communicate with the portions of the rear ends thereof communicating with the communication chamber 130.

That is, the front ends and both side ends of the delay chambers 120 are cut off from the communication chambers 130, and only portions of the rear ends of the delay chambers 120 may communicate with the deployment chamber 110 through the communication chambers 130.

Therefore, the gas in the deployment chamber 110 supplied to the communication chambers 130 may be supplied into the delay chambers 120 through portions of the rear ends of the delay chambers 120.

Further, the cut-off lines to cut off the remaining portions of the rear ends of the delay chambers 120 from the deployment chamber 110 extend forwards in the deployment direction of the cushion 100 and may thus guide gas flowing into the delay chambers 120 through the opened portions of the rear ends of the delay chambers 120.

Particularly, as shown in FIG. 3, the delay chambers 120 may be disposed at the center of the cushion, the deployment chamber 110 may be disposed to be located at both sides of the delay chambers 120, and the portions of the rear ends of the delay chambers 120, communicating with the corresponding communication chambers 130, may be located at the center of the delay chambers 120.

That is, the portions of the rear ends of the delay chambers 120, communicating with the corresponding communication chambers 130, may be located at the center of the cushion 100 so as to be maximally spaced apart from the deployment chamber 110 located at both sides of the delay chambers 120.

Therefore, gas supply from the deployment chamber 110 to the delay chambers 120 may be maximally delayed and thus the delay chambers 120 may be expanded after completion of deployment of the delay chambers 120, thereby making it possible to delay contraction of the cushion 100 in the width direction of the vehicle and reducing the possibility of deployment of the cushion 100 being interrupted due to damage to the deployment guides 300.

Here, a plurality of delay chambers 120 may be disposed so as to be spaced apart from each other in the deployment direction of the cushion 100.

The deployment chamber 110 may extend from the front portion to the rear portion of the vehicle, and the delay chambers 120 which are disposed in some regions of the deployment chamber 110, may be spaced apart from each other in the forward and backward directions of the vehicle, in the extension direction of the deployment guides 300, or in the deployment direction of the cushion 100.

Here, three delay chambers 120 may be provided, as shown in the drawings, or the delay chambers 120 may be provided in various numbers depending on the length of the panoramic sunroof of the vehicle. In order to implement multiple stages of pressure release and deployment speed, a larger number of delay chambers 120 may be provided.

Here, a plurality of delay chambers 120 may be disposed so as to be spaced apart from each other in the deployment direction of the cushion 100, and the cushion 100 may further include the communication chambers 130 which are located between the delay chambers 120 or located behind the delay chambers 120 in the deployment direction of the cushion 100 and communicate with the respective delay chambers 120 and the deployment chamber 110.

The communication chambers 130 which communicate with the rear ends of the delay chambers 120 may be formed behind the respective delay chambers 120, and the communication chambers 130 may communicate with the deployment chamber 110 extending in the deployment direction of the cushion 100.

FIGS. 8 to 13 are views illustrating roof airbags for a vehicle according to various embodiments of the present invention.

Figure 8:
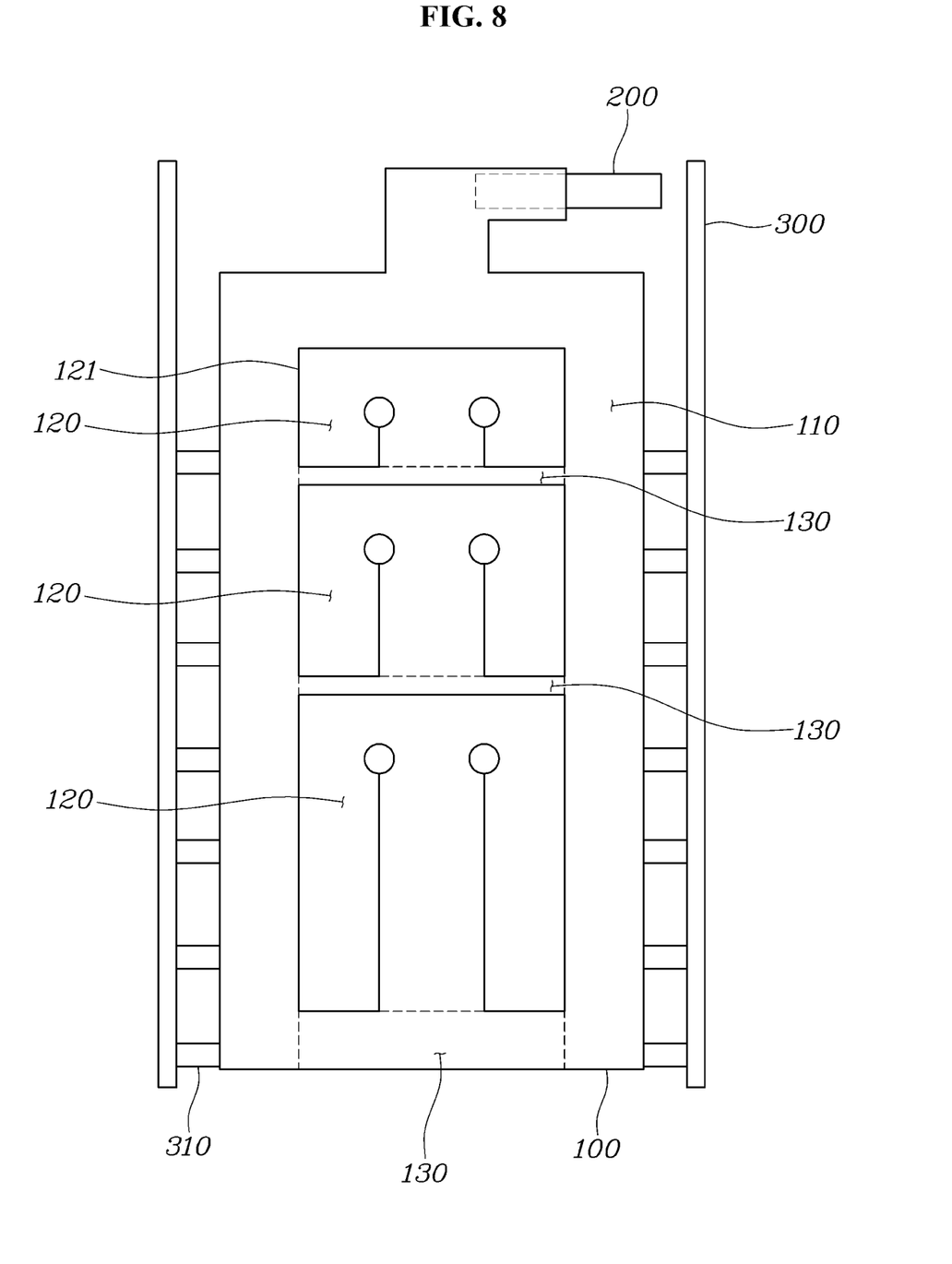
FIGS. 8, 9, 10, 11, 12, and 13 are views illustrating roof airbags for a vehicle according to various embodiments of the present invention.

As shown in FIG. 8, a plurality of delay chambers 120 which are spaced apart from each other may be disposed such that the lengths of the respective delay chambers 120 are gradually increased in the deployment direction of a cushion 100.

That is, the delay chambers 120 may be disposed to be spaced apart from each other in the deployment direction of the cushion 100 such that the lengths of the respective delay chambers 120 are gradually increased in the deployment direction of the cushion 100.

Therefore, in the early state of the deployment of the cushion 100 in which the gas supply performance of an inflator 200 is high, the pressure of a deployment chamber 110 may be released at an earlier point in time.

Figure 9:
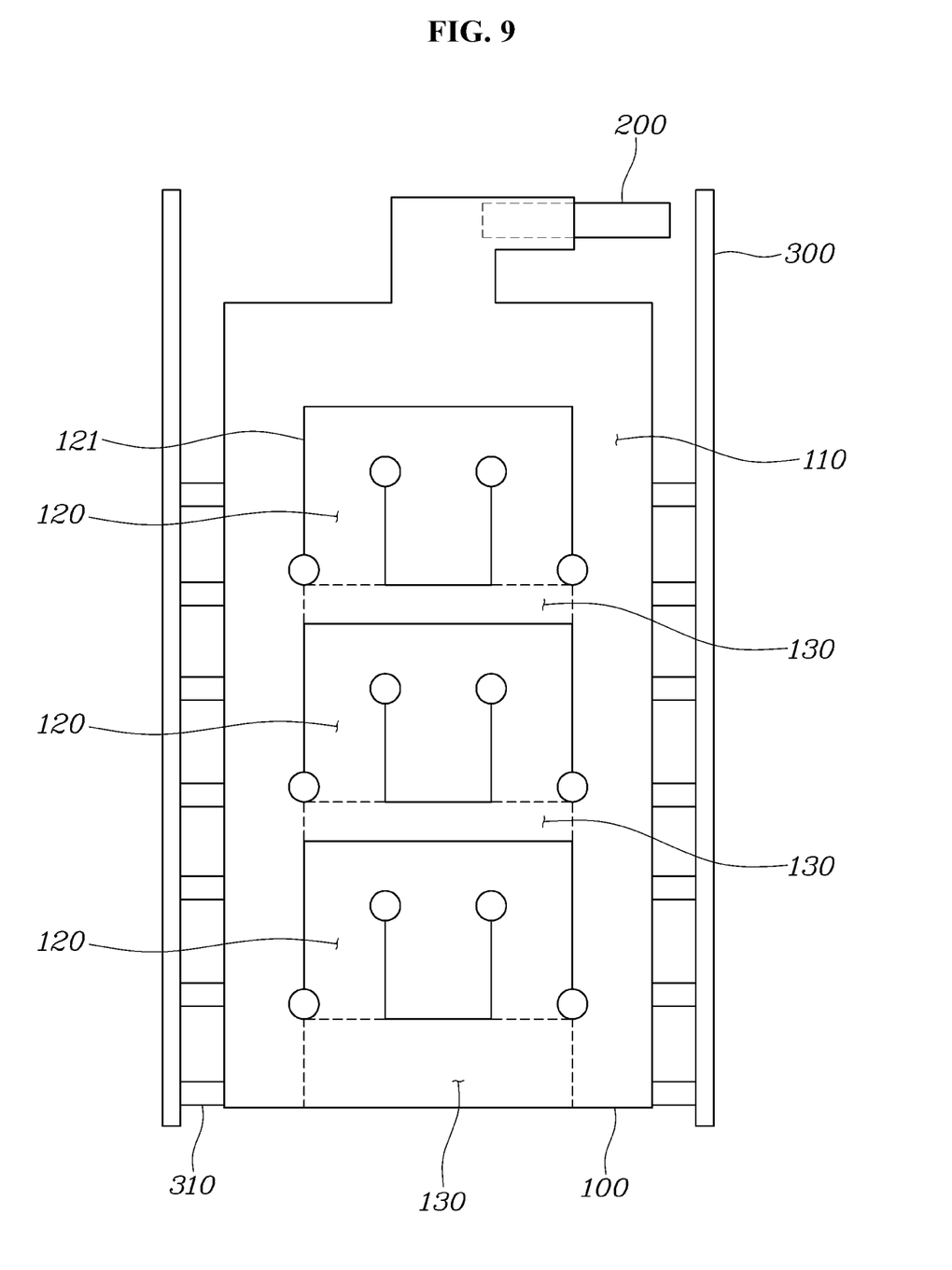

As shown in FIG. 9, delay chambers 120 may be disposed at the center of a cushion 100, a deployment chamber 110 may be disposed to be located at both sides of the delay chambers 120, portions of the rear ends of the delay chambers 120 in the deployment direction of the cushion 100, which communicate with communication chambers 130, are located at both sides of the delay chambers 120, and the centers of the delay chambers 120 may be isolated from the communication chambers 130 by cut-off lines.

That is, the central portions of the rear ends of the delay chambers 120 may be cut off, and both sides of the rear ends of the delay chambers 120 adjacent to the deploy chamber 110 may be opened. Therefore, gas in the deployment chamber 110 may rapidly flow into the delay chambers 120, and thereby, the pressure of the deployment chamber 110 may be rapidly released.

Figure 10:
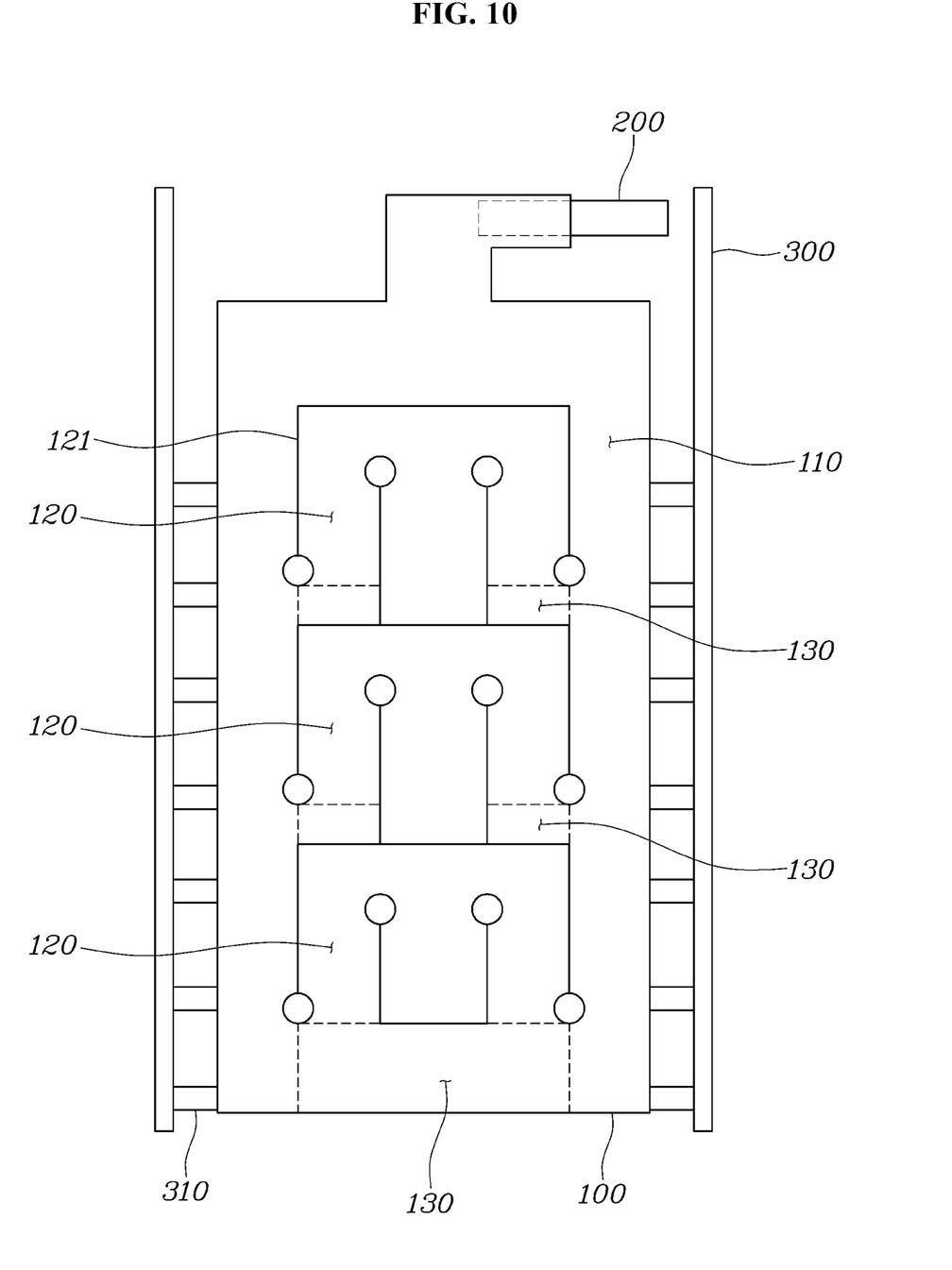
Figure 11:
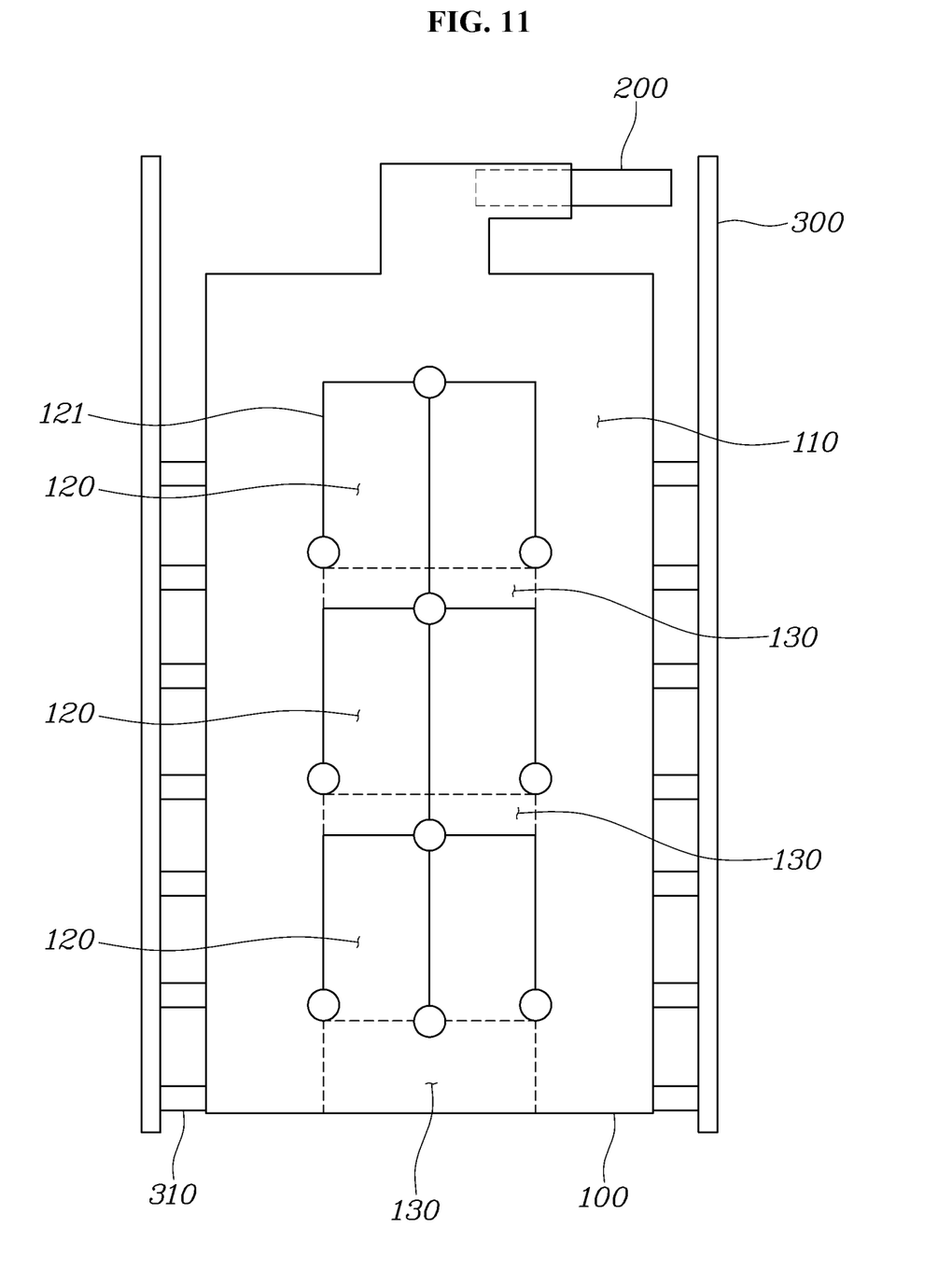

As shown in FIGS. 10 and 11, delay chambers 120 may be disposed at the center of a cushion 100, a deployment chamber 110 may be disposed to be located at both sides of the delay chambers 120, and communication chambers 130 may be disposed at the center of the cushion 100 behind the delay chambers 120 in the deployment direction of the cushion 100 and be divided into two parts by cut-off lines.

The cut-off lines may extend in the deployment direction of the cushion 100 and divide the communication chambers 130 and the delay chambers 120 into a plurality of parts.

As one example, as shown in FIG. 10, the delay chambers 120 except for the front portions thereof may be divided into a plurality of parts by the cut-off lines.

Alternatively, as shown in FIG. 11, both the delay chambers 120 and the communication chambers 130 may be divided into left and right parts by the cut-off lines, and the respective communication chambers 130 may communicate with the adjacent deployment chamber 110.

Figure 12:
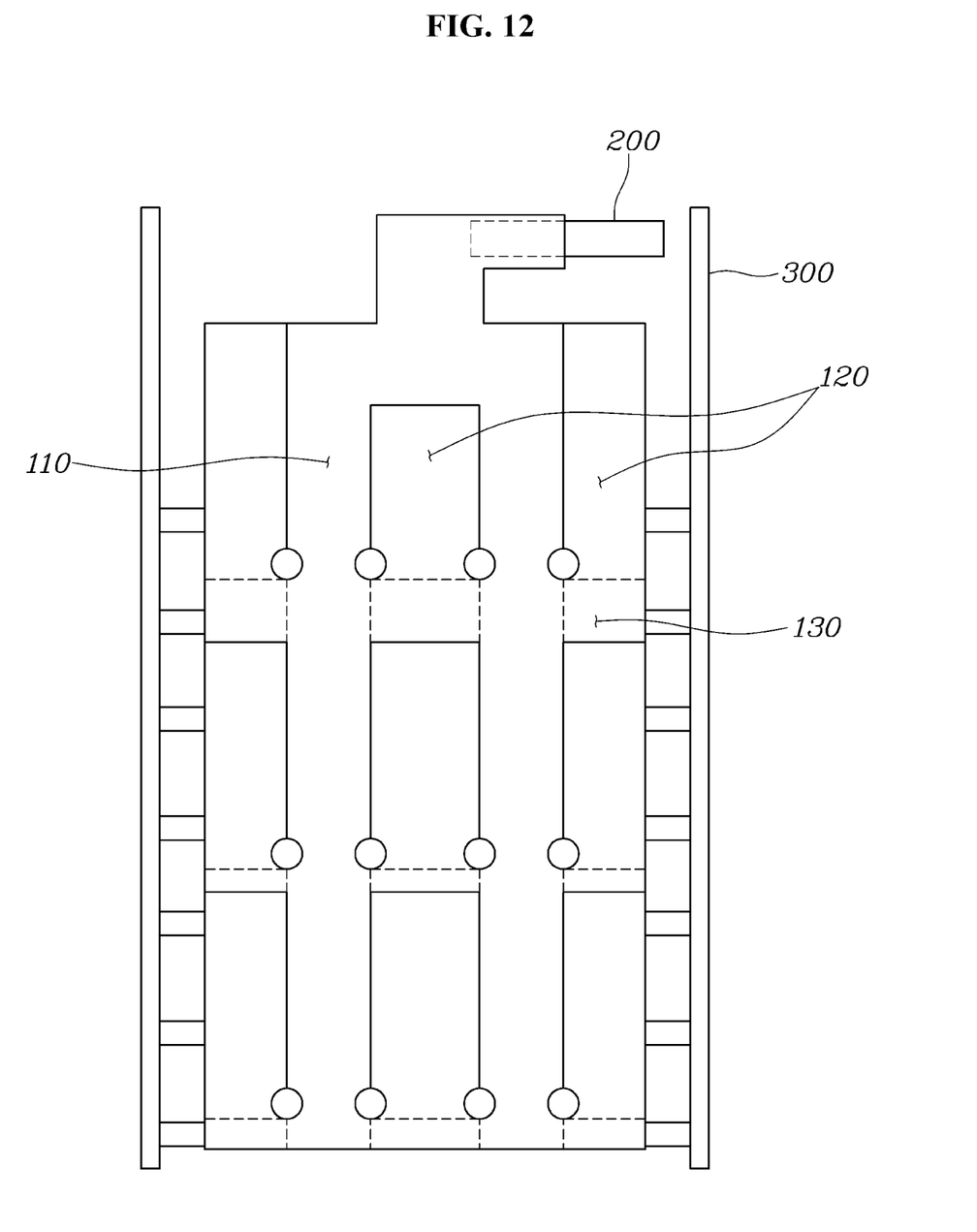

As shown in FIG. 12, delay chambers 120 may be disposed at the center and both sides of a cushion 100, respectively, and a deployment chamber 110 may be disposed to be located between the delay chambers 120 disposed at the center of the cushion 100 and the delay chambers 120 disposed at the sides of the cushion 100.

Here, a plurality of delay chambers 120 may be disposed, and the delay chamber 110 may extend between the delay chambers 120. That is, the delay chambers 120 may be disposed at the center and both sides of the cushion 100, respectively, and the deployment chamber 110 may be disposed to be located between the delay chambers 120.

Figure 13:
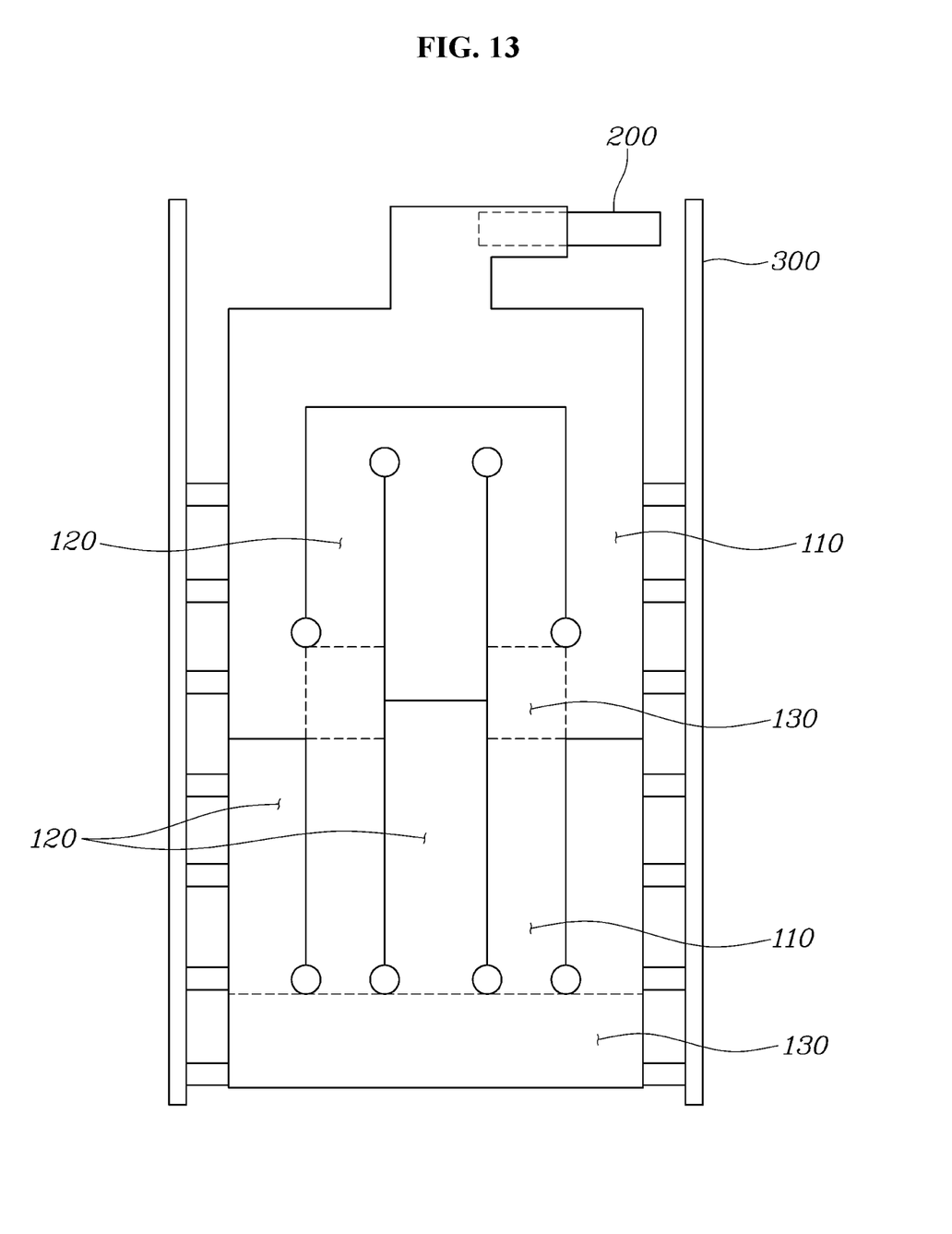

As shown in FIG. 13, the positions of delay chambers 120 and a deployment chamber 110 may be interchanged. That is, in the front half of a cushion 100 in the deployment direction of the cushion 100, the delay chamber 120 may be located at the center of the cushion 100 and the deployment chamber 110 may be disposed to be located outside the delay chamber 120, and in contrast, in the rear half of the cushion 100, the delay chambers 120 may be disposed at the center and both sides of the cushion 100, and the deployment chamber 110 may be disposed to be located between the delay chamber 120 disposed at the center of the cushion 100 and the delay chambers 120 disposed at the sides of the cushion 100, respectively.

As is apparent from the above description, a roof airbag for a vehicle according to the present invention reduces frictional resistance applied to deployment guides due to deployment of a cushion, thereby being capable of improving the deployment speed and the deployment reliability of the airbag.

Further, the roof airbag for a vehicle according to the present invention releases the inner pressure of the cushion while the cushion is being deployed, thereby being capable of reducing a possibility of damage to the airbag. In addition, the roof airbag for a vehicle according to the present invention additionally injects gas into the cushion in the state in which the cushion is deployed, thereby being capable of increasing rigidity of the airbag.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A roof airbag for a vehicle, comprising:
deployment guides configured to extend in forward and backward directions of a vehicle, and spaced laterally apart from each other;
an inflator located between the deployment guides and configured to discharge gas therefrom during operation thereof; and
a cushion located between the deployment guides, deployed in an extension direction of the deployment guides, and comprising:
a deployment chamber extending in a straight line in the extension direction of the deployment guides and configured to be deployed while the gas discharged from the inflator flows thereinto; and
a plurality of delay chambers spaced apart from each other in a deployment direction of the cushion and configured such that the gas flows thereinto in a deployed state thereof.

2. The roof airbag for a vehicle according to claim 1, wherein:

the deployment chamber is configured to be deployed in a deployment direction of the cushion while the gas discharged from the inflator flows into the deployment chamber; and the delay chambers are configured such that the gas in the deployment chamber flows thereinto in a state in which the delay chambers are deployed together with the deployment chamber.

3. The roof airbag for a vehicle according to claim 2, wherein the gas in the deployment chamber flows into the delay chambers in an opposite direction to the deployment direction of the cushion.

4. The roof airbag for a vehicle according to claim 2, wherein front ends of the delay chambers in the deployment direction of the cushion are cut off, rear ends of the delay chambers in the deployment direction of the cushion are opened, and the gas in the deployment chamber flows into the delay chambers through the opened rear ends of the delay chambers.

5. The roof airbag for a vehicle according to claim 1, wherein the deployment chamber and the delay chambers are disposed laterally so as to at least partially overlap each other in the forward and backward directions of the vehicle, and are isolated from each other by cut-off lines configured to extend in the forward and backward directions of the vehicle.

6. The roof airbag for a vehicle according to claim 1, wherein the delay chambers are disposed at a center of the cushion, and the deployment chamber is located at both sides of the delay chambers.

7. The roof airbag for a vehicle according to claim 1, wherein the cushion further comprises communication chambers located behind the delay chambers in the deployment direction of the cushion and configured to communicate with rear ends of the delay chambers in the deployment direction of the cushion and communicate with the deployment chamber.

8. The roof airbag for a vehicle according to claim 7, wherein, in a state in which portions of rear ends of the delay chambers in the deployment direction of the cushion communicate with the communication chambers and remaining portions of the rear ends of the delay chambers are isolated from the communication chambers, front ends of the delay chambers in the deployment direction of the cushion communicate with the portions of the rear ends thereof communicating with the communication chambers.

9. The roof airbag for a vehicle according to claim 8, wherein:
the delay chambers are disposed at a center of the cushion, and the deployment chamber is disposed to be located at both sides of the delay chambers; and
the portions of the rear ends of the delay chambers communicating with the communication chambers are located at centers of the delay chambers.

10. The roof airbag for a vehicle according to claim 8, wherein:
the delay chambers are disposed at a center of the cushion, and the deployment chamber is disposed to be located at both sides of the delay chambers;
the portions of the rear ends of the delay chambers communicating with communication chambers are located at both sides of the delay chambers, and centers of the delay chambers are isolated from the communication chambers by cut-off lines.

11. The roof airbag for a vehicle according to claim 7, wherein:
the delay chambers are disposed at a center of the cushion, and the deployment chamber is disposed to be located at both sides of the delay chambers; and
the communication chambers are disposed at the center of the cushion behind the delay chambers in the deployment direction of the cushion, and are divided into two parts by cut-off lines.

12. The roof airbag for a vehicle according to claim 1, wherein
the cushion further comprises communication chambers located between the delay chambers or located behind the delay chambers in the deployment direction of the cushion and configured to communicate with the respective delay chambers and the deployment chamber.

13. A roof airbag for a vehicle, comprising:
deployment guides configured to extend in forward and backward directions of a vehicle, and spaced laterally apart from each other;
an inflator located between the deployment guides and configured to discharge gas therefrom during operation thereof; and
a cushion located between the deployment guides, deployed in an extension direction of the deployment guides, and comprising:
a deployment chamber configured to be deployed while the gas discharged from the inflator flows thereinto; and
delay chambers configured such that the gas flows thereinto in a deployed state thereof,
wherein the delay chambers are disposed at a center and at both sides of the cushion, respectively, and the deployment chamber is located between the delay chambers disposed at the center of the cushion and the delay chambers disposed at the sides of the cushion.

14. The roof airbag for a vehicle according to claim 12, wherein the delay chambers spaced apart from each other are disposed such that lengths thereof are gradually increased in the deployment direction of the cushion.

* * * * *

UNITED STATES PATENT AND TRADEMARK OFFICE
CERTIFICATE OF CORRECTION

PATENT NO. : 11,400,880 B2
APPLICATION NO. : 16/951991
DATED : August 2, 2022
INVENTOR(S) : Choong Ryung Lee and Byung Ho Min It is certified that error appears in the above-identified patent and that said Letters Patent is hereby corrected as shown below:

On the Title Page

(73) Applicant; update the applicant "Hyundai Mobis Co., Ltd.vvvvvvvvv, Seoul (KR)" to "HYUNDAI MOBIS CO., LTD., Seoul (KR)"

Signed and Sealed this
Nineteenth Day of September, 2023

Katherine Kelly Vidal
*Director of the United States Patent and Trademark Office*